(12) United States Patent
Simon et al.

(10) Patent No.: US 8,021,773 B1
(45) Date of Patent: Sep. 20, 2011

(54) BATTERY SYSTEM

(75) Inventors: Steve D. Simon, Middletown, NJ (US);
Victor A. Lifton, Bridgewater, NJ (US);
Nathalie Pereira, Piscataway, NJ (US);
Glenn G. Amatucci, Peapack, NJ (US)

(73) Assignee: mPhase Technologies, Inc., Little Falls, NJ (US)

( * ) Notice: Subject to any disclaimer, the term of this patent is extended or adjusted under 35 U.S.C. 154(b) by 687 days.

(21) Appl. No.: 12/052,362

(22) Filed: Mar. 20, 2008

Related U.S. Application Data

(60) Provisional application No. 60/895,951, filed on Mar. 20, 2007.

(51) Int. Cl.
*H01M 10/50* (2006.01)
*H01M 2/00* (2006.01)
*H01M 10/48* (2006.01)
*H01M 6/42* (2006.01)

(52) U.S. Cl. ............... 429/62; 429/61; 429/90; 429/149

(58) Field of Classification Search ................ 429/9, 61, 429/62, 90, 149; 320/101
See application file for complete search history.

(56) References Cited

U.S. PATENT DOCUMENTS

| | | | | |
|---|---|---|---|---|
| 6,049,141 | A * | 4/2000 | Sieminski et al. | 307/44 |
| 6,074,775 | A * | 6/2000 | Gartstein et al. | 429/53 |
| 6,387,553 | B1 * | 5/2002 | Putt et al. | 429/3 |

* cited by examiner

*Primary Examiner* — Patrick Ryan
*Assistant Examiner* — Julian Mercado
(74) *Attorney, Agent, or Firm* — Michael S. Neustel

(57) ABSTRACT

A battery system for efficiently operating a battery under various circumstances, such as relating to extreme temperature ranges and varying load (i.e. current) ranges. The battery system generally includes at least one first cell having a first chemistry, at least one second cell having a second chemistry and a controller in communication with the first cell and the second cell. The controller is adapted to employ a chemical reaction of the first chemistry in the first cell or the second chemistry in the second cell. The first chemistry is different than the second chemistry, wherein the first chemistry and the second chemistry may be adapted to provide current over varying temperature ranges or to provide current for varying current loads.

17 Claims, 10 Drawing Sheets

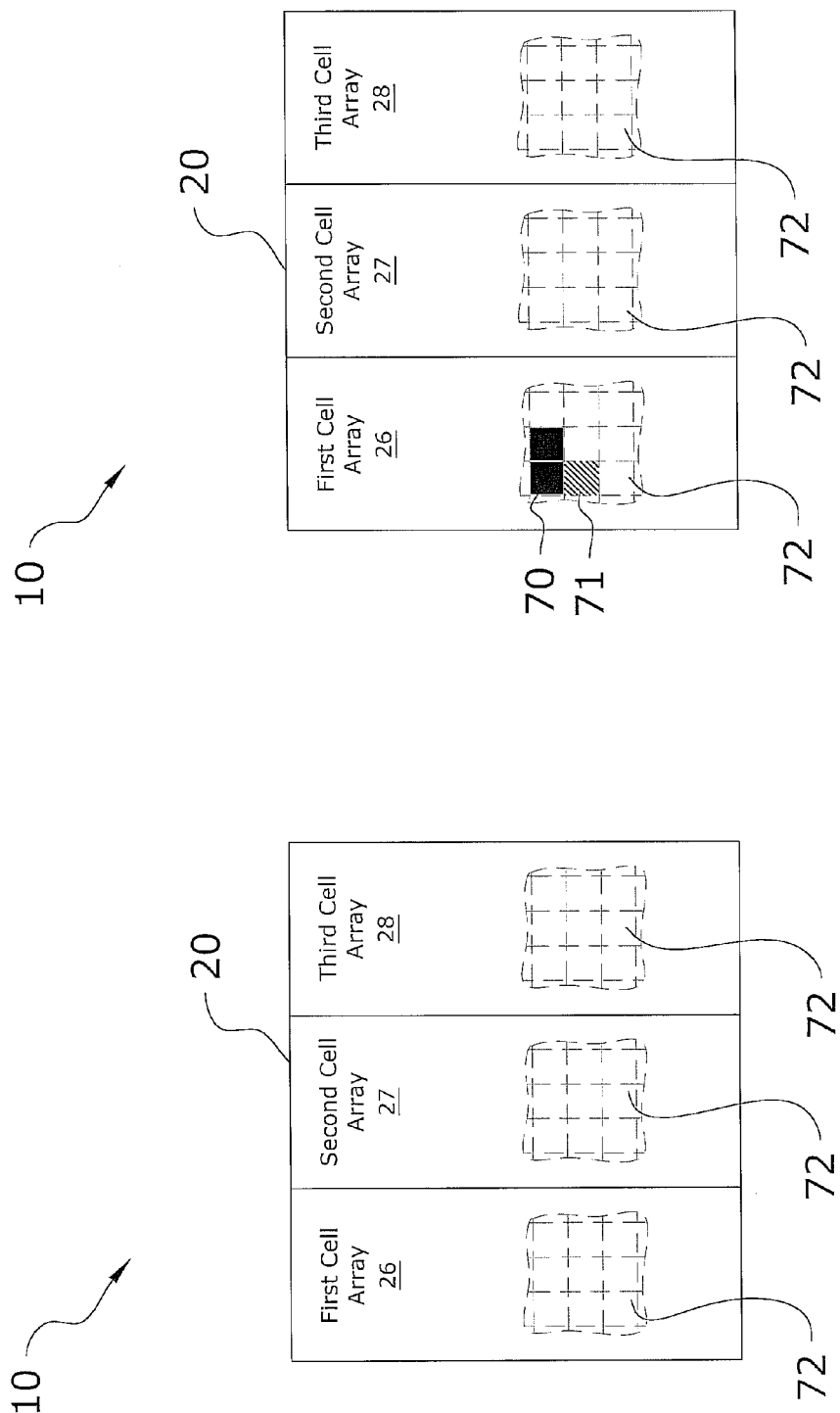

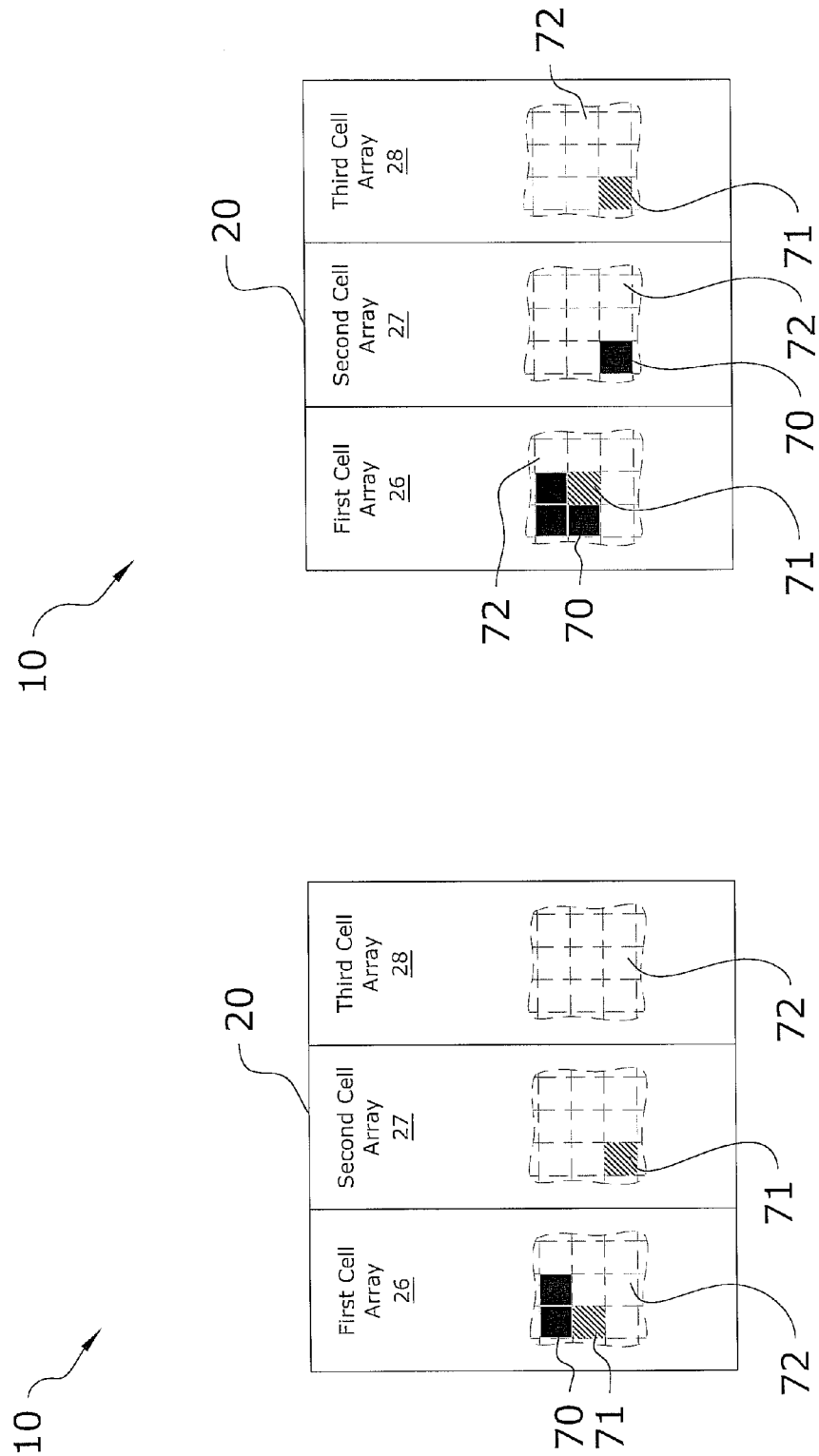

BATTERY SYSTEM

CROSS REFERENCE TO RELATED APPLICATIONS

I hereby claim benefit under Title 35, United States Code, Section 119(e) of U.S. provisional patent application Ser. No. 60/895,951 filed Mar. 20, 2007. The 60/895,951 application is currently pending. The 60/895,951 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to energy storage systems and more specifically it relates to a battery system for efficiently operating a battery under various circumstances, such as relating to extreme temperature ranges and varying load (i.e. current) ranges.

2. Description of the Related Art

Any discussion of the related art throughout the specification should in no way be considered as an admission that such related art is widely known or forms part of common general knowledge in the field.

Energy storage systems, such as batteries, electrochemical capacitors and pseudocapacitors among other electrochemical energy storage devices have been in use for years and are utilized in wide variety of applications common to various types of industries. A battery is a device that converts chemical energy directly to electrical energy. The battery generally comprises one or more electrochemical cells each including at least two electrodes which are selectively electrically connected by an electrolyte substance, wherein the electrolyte substance is generally comprised of a solid substance or a liquid substance. Generally, batteries are classified as primary, secondary and reserve. In many of the voltaic cells of the reserve battery, the electrodes and the electrolyte substance are enclosed in a container, and a barrier, which may be porous to the electrolyte substance, prevents the electrodes from coming into contact with the electrolyte substance until desired.

The various battery chemistries are typically designed to operate within temperature ranges of −20° C. (Celsius) to 50° C. (i.e. normal operating range) thus making the batteries useful for general purpose environments. However, other classes of applications including, for example, defense, science and space exploration may require both lower and higher operating temperatures. Achieving these temperature extremes within a single battery configuration may prove to be extremely difficult and thus decrease the usefulness of a battery in these certain situations.

Different chemicals may also be utilized in different cells of a battery to generate different voltage characteristics. For example, 1.5 volts may be generated for a $Zn/MnO_2$ alkaline electrode combination or 3 volts may be generated for a $Li/MnO_2$ lithium electrode combination.

Also, it may be of benefit to provide a single battery in which to provide different load (i.e. current) capabilities depending on the requirements of the device that is to be powered. Providing a power source in which to provide multiple load capabilities in the past generally requires multiple batteries each which provide a different load capability.

Because of the inherent problems with the related art, there is a need for a new and improved battery system for efficiently operating a battery under various circumstances, such as relating to extreme temperature ranges and varying load (i.e. current) ranges.

BRIEF SUMMARY OF THE INVENTION

The general purpose of the present invention is to provide a battery system that has many of the advantages of the energy storage systems mentioned heretofore. The invention generally relates to an electrochemical energy storage system which includes at least one first cell having a first chemistry, at least one second cell having a second chemistry and a controller in communication with the first cell and the second cell. The controller is adapted to employ a chemical reaction of the first chemistry in the first cell or the second chemistry in the second cell. The first chemistry is different than the second chemistry, wherein the first chemistry and the second chemistry may be adapted to provide current over varying temperature ranges or to provide current for varying current loads. For illustrative purposes electrochemical energy storage systems can include batteries, electrochemical capacitors and pseudocapacitors.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a battery system for efficiently operating under various circumstances, such as relating to extreme temperature ranges and varying load (i.e. current) ranges.

An additional object is to provide a battery system that includes a controller to individually address and activate each cell of the cell array.

An additional object is to provide a battery system that includes a controller, wherein the controller includes a sensor, wherein the sensor is comprised of a temperature sensor.

An additional object is to provide a battery system that includes a controller, wherein the controller includes a sensor, wherein the sensor is comprised of a current load sensor.

A further object is to provide a battery system that includes a plurality of different cell arrays, wherein each array includes a specific chemical composition and may activate according to a different circumstance.

A further object is to provide a battery system that includes a first cell array and a second cell array, wherein the first cell array has a first chemistry and the second cell array has a second chemistry.

A further object is to provide a battery system that includes a first cell having a first chemistry adapted to provide current over a first temperature range and a second cell having a second chemistry adapted to provide current over a second temperature range.

A further object is to provide a battery system that includes a controller which includes control logic for determining an addressing sequence of a first cell and a second cell based on temperature conditions.

A further object is to provide a battery system that includes a controller that includes control logic for determining an addressing sequence of a first cell and a second cell based on capacity load consumption.

A further object is to provide a battery system that includes a first cell having a first chemistry comprising primary (non-rechargeable chemistry) and a second cell having a second chemistry comprising secondary (rechargeable) chemistry.

A further object is to provide a battery system that includes a first cell having a first chemistry comprising lithium and manganese dioxide and a second cell having a second chemistry comprising lithium and bismuth fluoride.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3a-3f illustrate an example battery being utilized.

DETAILED DESCRIPTION OF THE INVENTION

A. Overview

Figure 1:
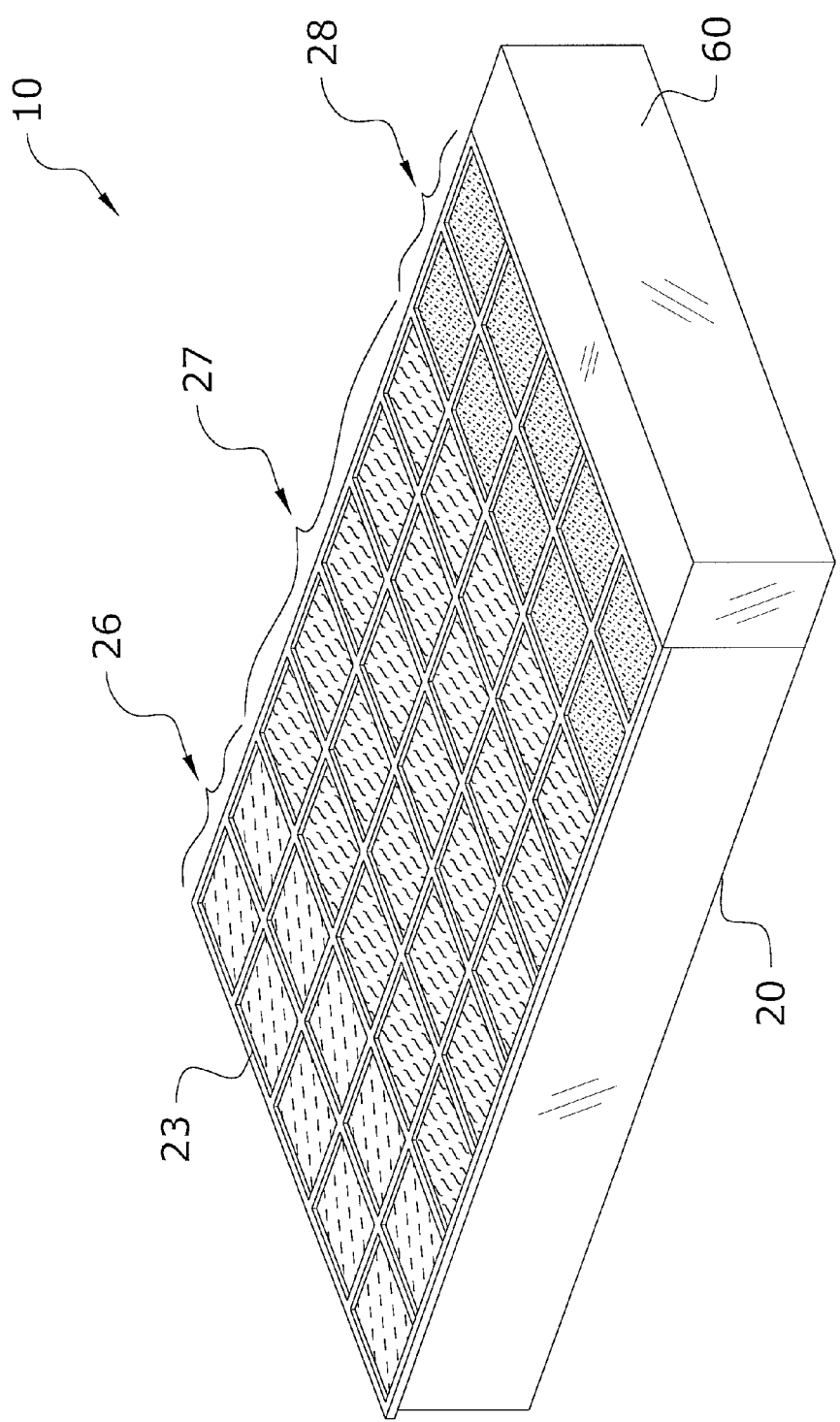
FIG. 1 is an upper perspective view of the present invention illustrating the cell array and a plurality of arrays defined among the cell array.

Turning now descriptively to the drawings, in which similar reference characters denote similar elements throughout the several views, FIGS. 1 through 8 illustrate a battery system, which comprises at least one first cell 26 having a first chemistry (i.e. chemistry composition of the electrodes and the electrolyte), at least one second cell 27 having a second chemistry (i.e. chemistry composition of the electrodes and the electrolyte) and a controller 60 in communication with the first cell 26 and the second cell 27.

The controller 60 is adapted to employ a chemical reaction of the first chemistry in the first cell 26 or the second chemistry in the second cell 27. The first chemistry is different than the second chemistry, wherein the first chemistry and the second chemistry may be adapted to provide current over varying temperature ranges or to provide current for varying current loads.

It is appreciated that more or less cells or arrays of cells than illustrated and described in the present invention may be utilized with the present invention depending upon the desired application. It is also appreciated that the present invention interchanges the term cell as to mean a single cell and cell array as to mean a plurality of cells that may be grouped in various manners, wherein the terms cell and cell array are interchangeable in the present invention and simply are both utilized to illustrate the wide variety of applications and battery sizes that the present invention in which the present invention may be utilized. It is also appreciated that the terms first cell array 26, second cell array 27 and third cell array 28 are not meant to be limiting, wherein the present invention may include more or less numbers of cells or cell arrays than described. It is also appreciated that an electrode in an electrochemical storage device consists of a cathode and an anode.

B. Enclosure

Figure 8:
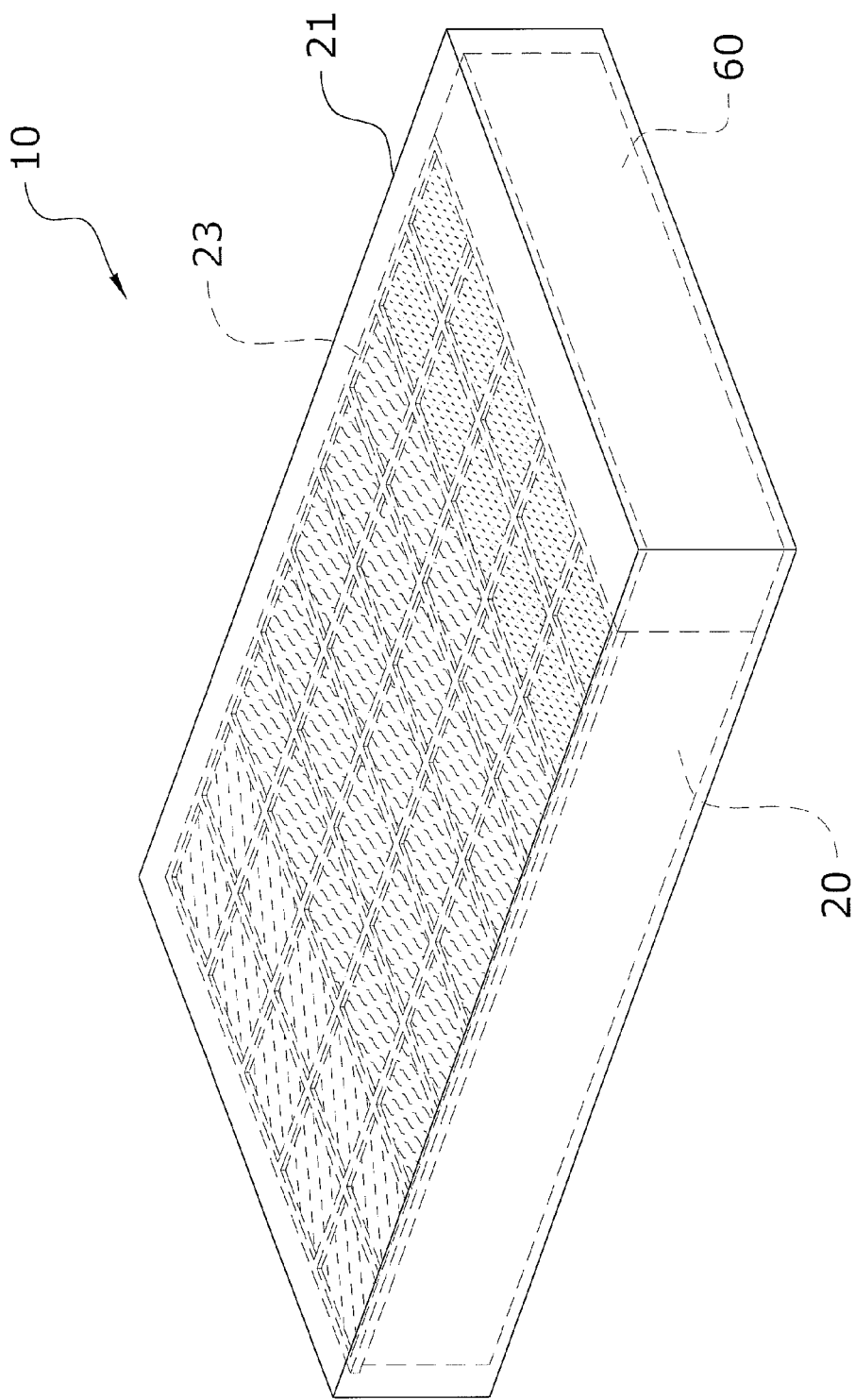
FIG. 8 is an upper perspective view of the present invention illustrating the cell array positioned within an enclosure.

The present invention is preferably comprised of a battery 20, wherein the battery 20 includes an enclosure 21 (as illustrated in FIG. 8) to encompass all of the cells 26, 27, 28. The enclosure 21 may be comprised of various configurations, such as a battery casing, all which enclose the materials within and prevent the chemical substances within from leaking out of the enclosure 21. The enclosure 21 may be comprised of various sizes commonly associated with various types and sizes of batteries.

The enclosure 21 may also include various different types of mechanisms for activating the cells 26, 27, 28 and for varying the ratio of the number of cell combinations. It is appreciated that although the present invention is primarily described as being utilized with batteries, the present invention may be utilized in conjuncture with any type of device that requires the electrolyte 31 to contact an electrode 41 according to a particular temperature range or when a particular current load is needed.

C. Cell Arrays

The present invention preferably includes a plurality of cell arrays 26, 27, 28 preferably positioned within the enclosure 21. The cell arrays 26, 27, 28 are preferably separately defined so that each cell within the cell arrays 26, 27, 28 may include electrodes 41, an electrolyte 31 and a membrane 51. Each cell 26, 27, 28 may also activate (i.e. employ a chemical reaction between the electrolyte 31 and the electrode 41) at a different time or under a different circumstance. The chemistry of the cells 26, 27, 28 may also be chemically configured to be comprised of a rechargeable chemistry (may be utilized more than once) composition or a non-rechargeable chemistry composition (may only be utilized once).

The cell arrays 26, 27, 28 may be arranged in a plurality of different configurations according to the particular arrangement desired. The cell arrays 26, 27, 28 may also be scaled to be sized in various sizes. The configuration of the cell arrays 26, 27, 28 may be based upon various factors, such as expected balance of energy performance, and capacity and environmental operating temperature exposure for the battery 20, size of the enclosure 21 for the cell arrays 26, 27, 28 and enclosure 21, such as a cellular phone housing.

The cells within the cell arrays 26, 27, 28 are also preferably designed and structured to withstand high vibration environments or to protect the corresponding cell when the enclosure 21 is dropped. For example, the membrane 51 of the barrier portion 50 may be solid rather than porous. The pore size of the porous membrane 51 may also be varied to withstand the different vibration environments. Likewise, the electrode 41 material can be varied to have different vibration and "survivable" characteristics.

Each cell in the cell arrays 26, 27, 28 is also preferably individually addressable, wherein each cell may be individually activated. The cells in the cell arrays 26, 27, 28 may also be addressed on demand, as needed and determined by the state of adjacent or connected cells, state of the environment surrounding the cells (e.g. temperature), current load that is to be delivered from the present invention or various other factors. The cells in the cell arrays 26, 27, 28 may also be addressed in various other manners, such as in a parallel or series manner. The number of cells in the cell arrays 26, 27, 28 addressed at one given time may also vary depending upon the required capacity and load of the device electrically connected to the present invention that is to be powered.

The cells in the cell arrays 26, 27, 28 may also include isolated chambers or compartments 23 with specific chemistry combinations within suitable to a general range of temperatures to which the present invention is exposed or a desired current load delivered. The compartments 23 preferably separate the multiple cells from each other within a respective cell array 26, 27, 28 and from other cells in adjacent cell arrays 26, 27, 28. For example the cell arrays 26, 27, 28 may include cells suitable for utilizing the present invention at extreme low temperature ranges (i.e. below the general purpose temperature range) such as a first cell array 26, or cells suitable for utilizing the present invention at extreme high temperature ranges (i.e. above the general purpose temperature range) such as a second cell array 27 or cells suitable for utilizing the present invention at normal temperature ranges (e.g. approximately −20° Celsius to 50° Celsius) such as a third cell array 28.

It is appreciated that optimal temperature ranges of chemistry combinations in cells of the cell arrays 26, 27, 28 designed for high temperatures ranges, normal temperature ranges and low temperature ranges may also overlap. It is appreciated that one skilled in the art may realize that there are multiple chemistry combinations that may be utilized in the cells of the cell arrays 26, 27, 28 to achieve the desired effects.

The cell arrays 26, 27, 28 each provide an optimal chemical reaction between the electrolyte 31 and the electrodes 41 for the given temperature that the chemistry of the respective cells are suited for. The cell arrays 26, 27, 28 also preferably each include a unique operating characteristic to define each array 26, 27, 28 and allow the present invention to provide current under multiple operating conditions (e.g. extreme high temperatures, extreme low temperatures, etc.).

The cell arrays 26, 27, 28 may also be divided according to an optimal output current range. A portion of the cell arrays 26, 27, 28 may focus on outputting a particular current range and another portion of the cell arrays 26, 27, 28 may focus on operating in a given temperature range. For example, some chemistry combinations (of the electrolyte 31 and the electrodes 41 as illustrated in FIG. 5) are good at providing low current for long periods of time, whereas other chemistry combinations are good at delivering a short burst of current for short periods of time.

By combining several chemistry combinations among several different cell arrays 26, 27, 28, the present invention is capable of operating under various load capabilities. It is also appreciated that the cell arrays 27 utilized in normal circumstances under normal operating conditions may be much larger in size (i.e. include more cells) or include larger amounts of chemicals for providing a longer useful life than the cell arrays 26, 28 for use under extreme (temperature or current) conditions, wherein the cell arrays 27 utilized under normal operating conditions are statistically utilized more often than the cell arrays 26, 28 utilized primarily for extreme conditions. It is appreciated that although the cell arrays 26, 27, 28 in the present invention are described as being separately configured to be utilized according to an ambient temperature or a desired current load, the cell arrays 26, 27, 28 may be configured according to various other factors that may affect or minimize the efficiency of one chemistry combination and be optimal for a different chemistry combination to produce a chemical reaction.

D. Electrolyte, Electrodes, Membrane

Figure 5:
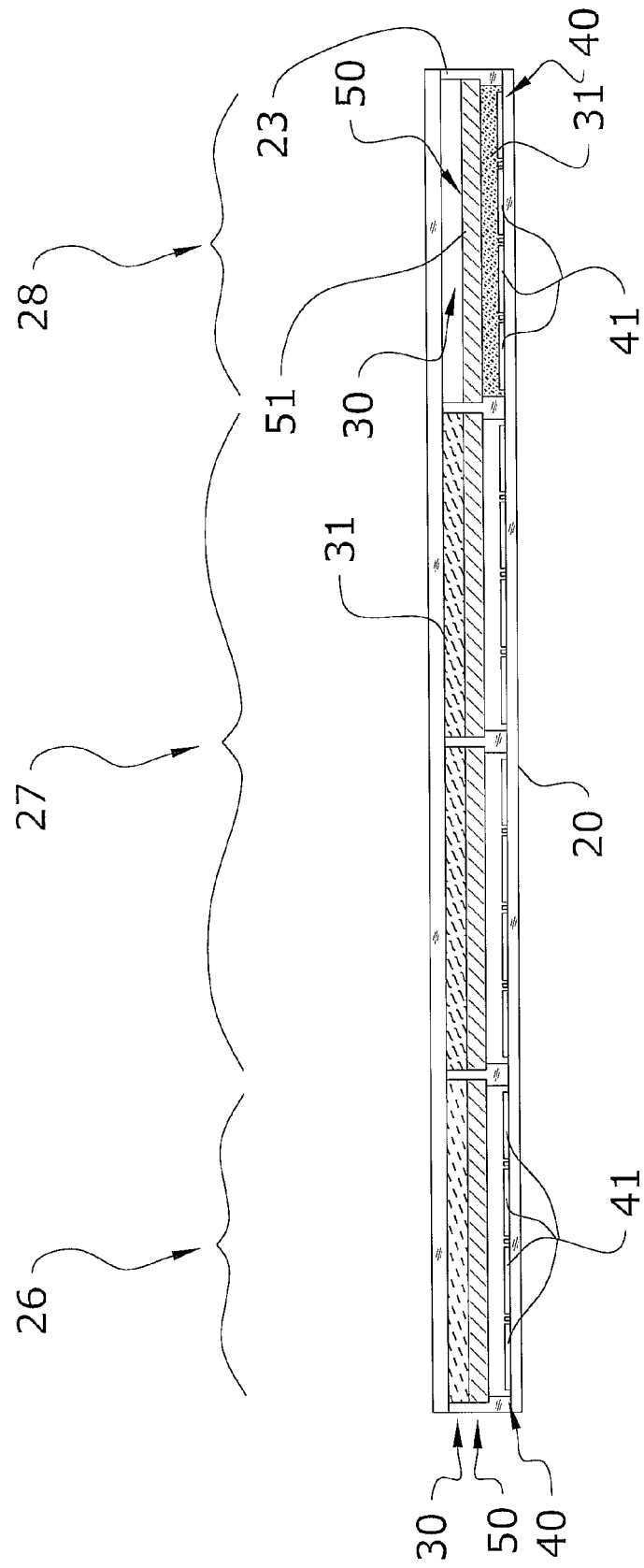
FIG. 5 is a sectional view of an illustration of the present invention illustrating one of the arrays activated and the others in a reserve state.
Figure 6:
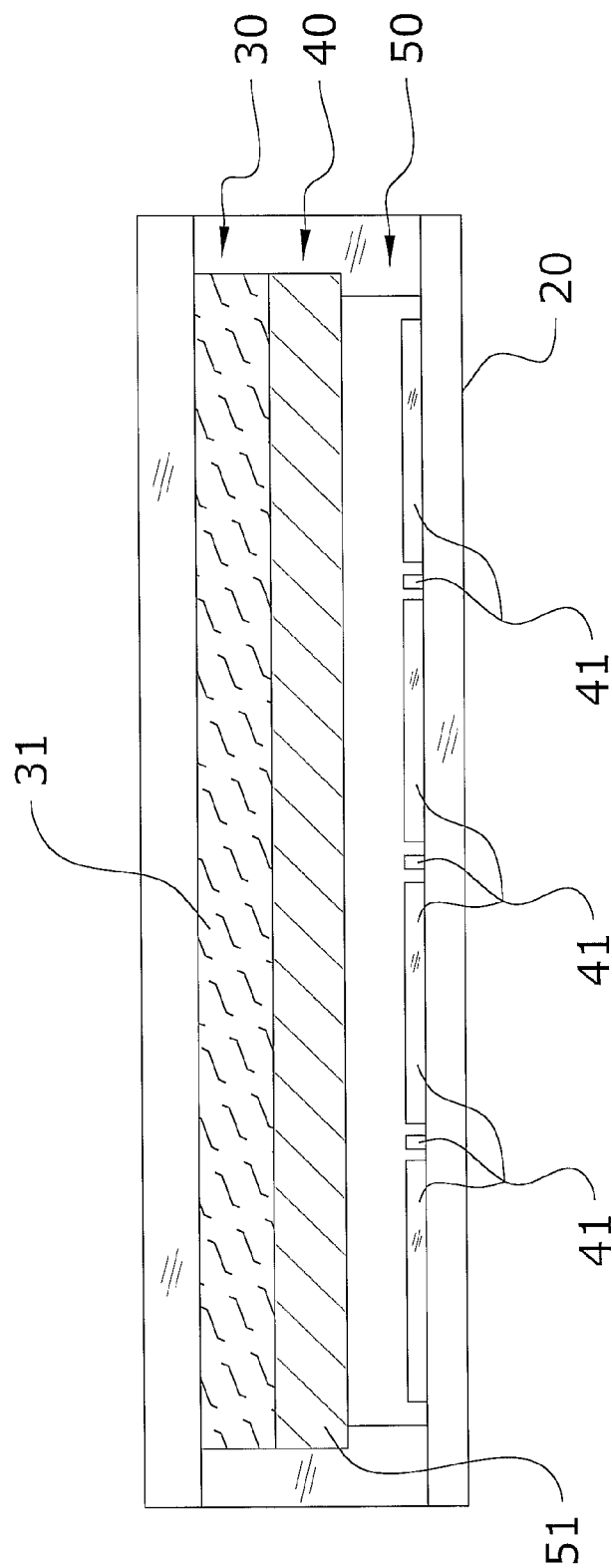
FIG. 6 is a sectional view illustrating one of the cells of the present invention.

A first portion 30 (as illustrated in FIG. 5) is defined within the cell arrays 26, 27, 28 to store an electrolyte 31. The first portion 30 preferably temporarily stores the electrolyte 31 within the first portion 30 when separated from the electrodes 41 of the second portion 40. During an activated state, the electrolyte 31 at least partially leaves the first portion 30 to enter the second portion 40 and thus come in contact with the electrodes 41. The first portion 30 and the second portion 40 may be defined in various configurations within each of the cell arrays 26, 27, 28 and are preferably defined by the barrier portion 50.

The first portion 30, second portion 40 and barrier portion 50 are preferably contained within the enclosure 21. The first portion 30 is preferably divided into each one of the cell arrays 26, 27, 28 and may include various combinations of electrolyte 31 in the first portion 30 to correspond with various electrodes 41 in the second portion 40. The electrolyte 31 may be comprised of a liquid substance.

The chemistry of the electrolyte 31 may be comprised of various chemical configurations, such as a mixture of organic liquids and corresponding lithium salts to provide functionality at low temperature such as in the first cell array 26. The chemistry of the electrolyte 31 may further be comprised of a mixture of organic liquids and corresponding lithium salts to provide battery functionality at high temperature such as in the second cell array 28. It is appreciated that the electrolyte 31 may be comprised of different chemistries for different cell arrays 26, 27, 28.

It is also appreciated that for extreme low temperatures, a non-aqueous electrolyte may be comprised of a ternary and quaternary-carbonate base electrolyte and containing linear esters (e.g. diethyl carbonate, ethyl methyl carbonate, ethyl acetate, etc.) that can be utilized to lower the viscosity and the melting point of the electrolyte 31. Combinations of the previously described mixtures of the electrolyte can enable operation down to −50° Celsius. For extreme high temperatures, cyclic ester-rich electrolyte, as well as nonvolatile ionic liquids may be utilized.

In addition to chemically configuring the first portion 30 to correspond and activate for a given temperature, the first portion 30 may be chemically configured to provide a given current load. The electrolyte 31 may comprise a mixture of organic liquids and corresponding lithium salts to provide functionality at low drain currents in the first cell array 26 and the electrolyte 31 may comprise a mixture of organic liquids and corresponding lithium salts to provide battery functionality at high drain currents in a second cell array 27. It is appreciated that a single cell array 26, 27, 28 may include multiple chemical combinations of the electrolyte 31 and the electrode 41 to provide a plurality of cell arrays 26, 27, 28 that activate and are utilized under a wide variety of circumstances, such as ambient temperature and desired current load to be delivered.

A second portion 40 is defined within the cell arrays 26, 27, 28 to store electrodes 41. The second portion 40 is also preferably contained within the enclosure 21. A pair of electrodes 41 (negative and positive) corresponds with an amount of electrolyte 31 in each of the cells of the cell arrays 26, 27, 28. The cell arrays 26, 27, 28 are also electrically connected in a manner corresponding with the desired sequence to utilize each of the cells.

The electrodes 41 may also be comprised of various chemical combinations according to various operating conditions desired. For example, the electrodes 41 in a first cell array 26 may be comprised of lithium and manganese dioxide chemistry and the electrodes in a second cell array 27 may be comprised of lithium and bismuth fluoride chemistry. In certain instances electrodes can further be constructed on the surface of a substrate for example carbon, silicon, metals or polymers.

The barrier portion 50 is defined between the first portion 30 and the second portion 40 within the enclosure 21. The barrier portion 50 is preferably comprised of a porous or solid membrane 51 that separates the first portion 30 from the second portion 40. The barrier portion 50 is also preferably comprised of a triggerable configuration, wherein the barrier portion 50 may be triggered in various manners, such as through a voltage pulse, radio frequency pulse, a certain temperature, a certain acceleration, through logic circuitry, and various others.

The present invention is preferably in a reserve state when the barrier portion 50 is separating the first portion 30 from the second portion 40 and accordingly there is no chemical reaction and no electricity generated of voltage provided by the battery 20. In the activated state, the membrane 51 of the barrier portion 50 is triggered to allow the electrolyte 31 to flow through the membrane 51 and contact with the electrodes 41. The chemical reaction is initiated and the electricity is generated.

E. Controller

Figure 7:
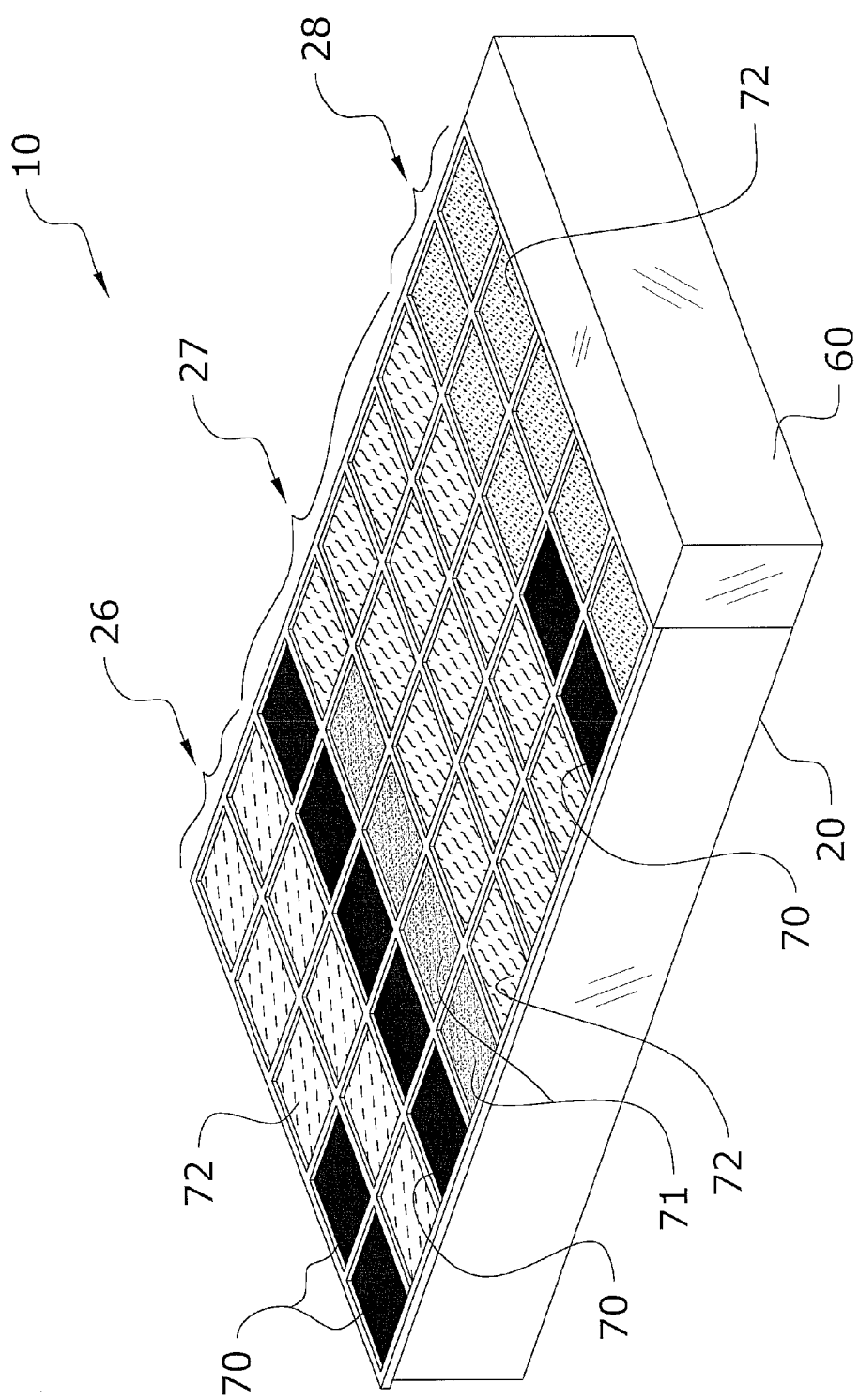
FIG. 7 is an upper perspective view of the present invention illustrating the cell array, wherein a portion of the cells are used, a portion of the cells are currently active and a portion of the cells are unused.

Each of the cells within the cell arrays 26, 27, 28 may also be connected to a controller 60 (as illustrated in FIG. 7) to provide control logic associated with determining the addressing sequence of activating unused cells 72 or a multiplicity of cells in the array. It is appreciated that the used cells 70, the active cells 71 and the reserve (unused) cells 72 as described in the present invention may be any of the cells within a single cell array 26, 27, 28 or multiple cell arrays 26, 27, 28 which are correspondingly already used, currently active, or in reserve for future use. The used cells 70 are cells within one or more cell arrays 26, 27, 28 in which the chemicals for the chemical reaction have already depleted. The active cells 71 are cells within one or more cell arrays 26, 27, 28 currently in use and the unused cells 72 are cells within one or more cell arrays 26, 27, 28 that may be utilized after the active cells 71 no longer work. The controller 60 preferably determines which cells of the unused cells 72 within the cell arrays 26, 27, 28 are to be utilized next based upon ambient temperatures or current load desired.

The present invention may simply be comprised of a standard battery (i.e. battery common in the art) including a controller 60 in which to designate a desired cell of a single cell array 26, 27 or 28 to be utilized. The controller 60 may also activate the cells based upon temperature conditions. The controller 60 may alternately or in combination be associated with determining the addressing sequence of activating unused cells 70 or a multiplicity of cells in the cell arrays 26, 27, 28 on capacity load consumption.

Figure 2:
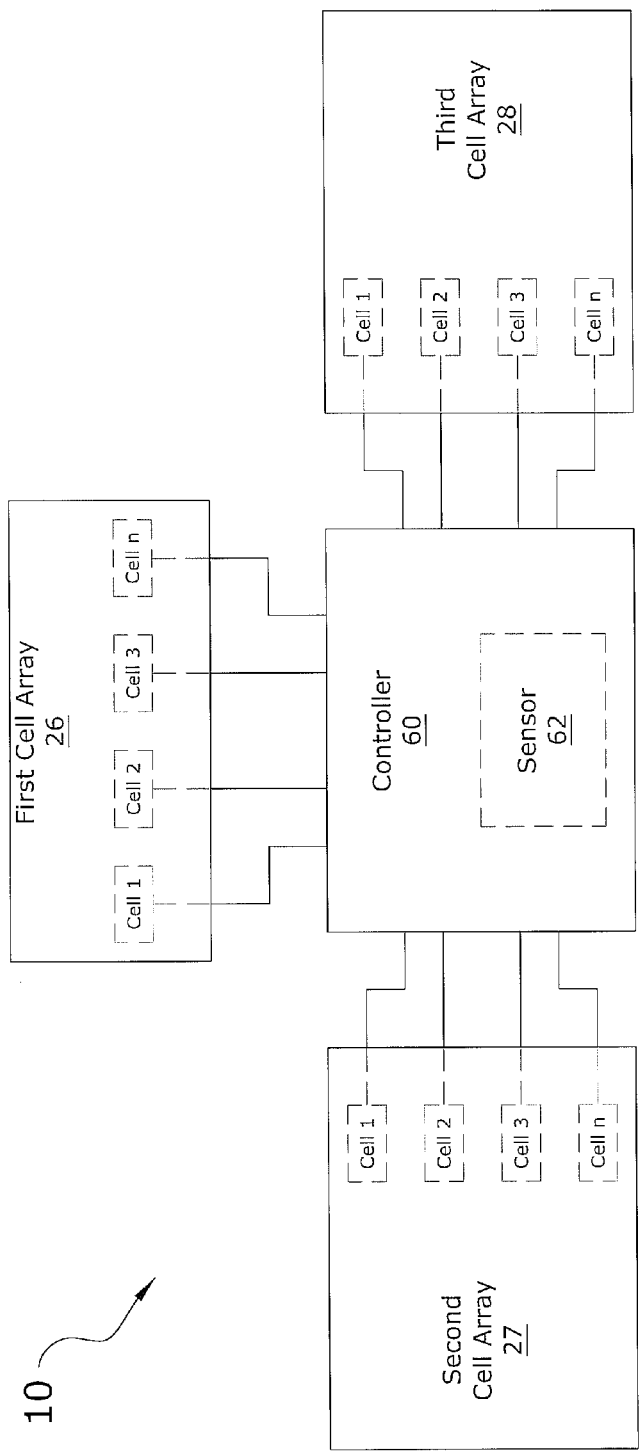
FIG. 2 is a block diagram illustrating the plurality of cells of the present invention individually connected to and addressable by the controller.
Figure 4:
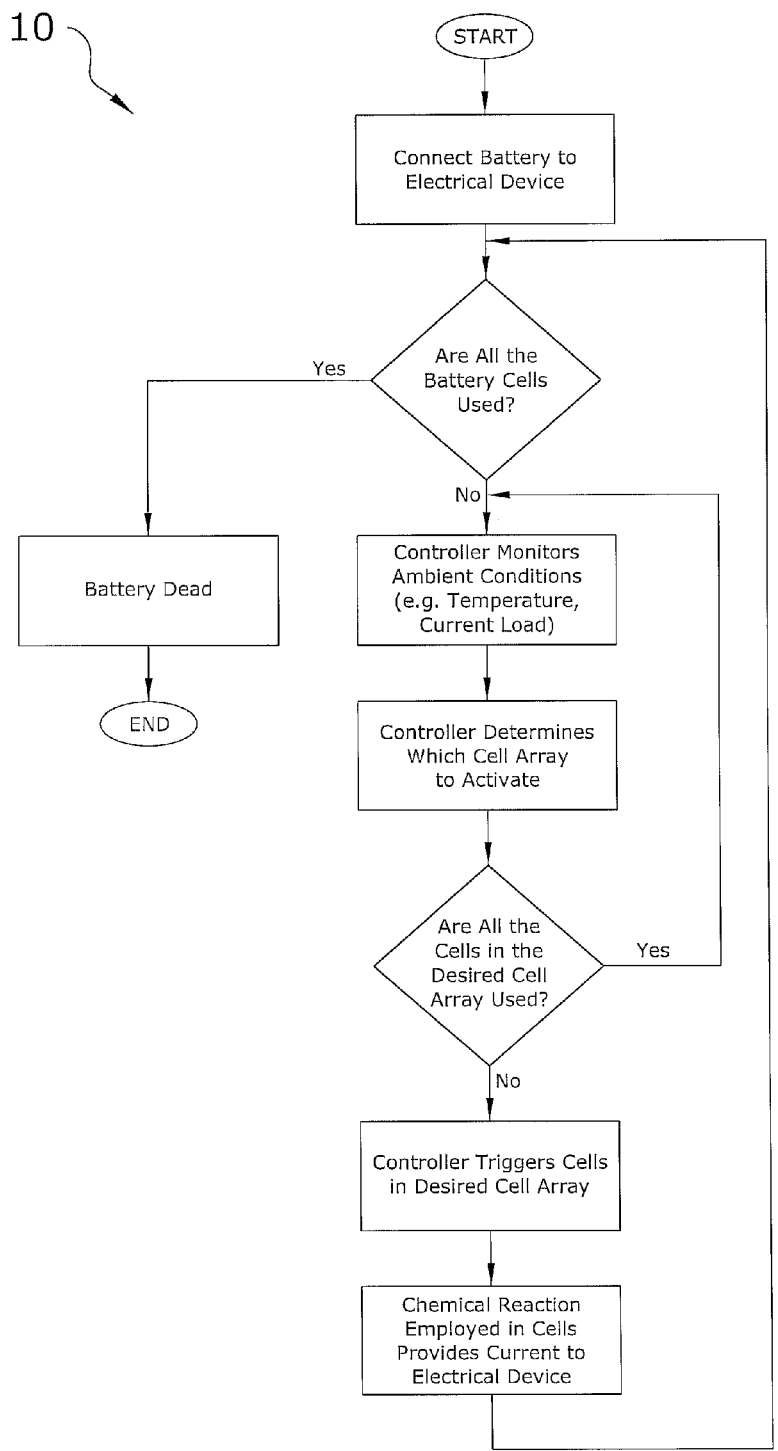
FIG. 4 is a flow chart illustrating the process of the present invention.

The controller 60 may be individually addressed to cells within the cell arrays 26, 27, 28 or may address the cell arrays 26, 27, 28 as a whole. The logic control of the controller 60 may also sense low and high temperature ambient conditions to subsequently activate a corresponding cell arrays 26, 27, 28. The present invention may include additional circuitry such as a voltage regulator, such that individual cells or a multiplicity of cells containing different chemistries can output different voltages and energy capacities based on power consumption requests from the device requiring power and electrically connected to the enclosure. The controller 60 also preferably includes at least one sensor 62 (as illustrated in FIG. 2). The sensor 62 may be comprised of a current sensor to determine a desired current load or may be comprised of a temperature sensor. FIG. 4 illustrates the controller logic for determining which cell to activate.

F. Operation of Preferred Embodiment

Figure 3F:
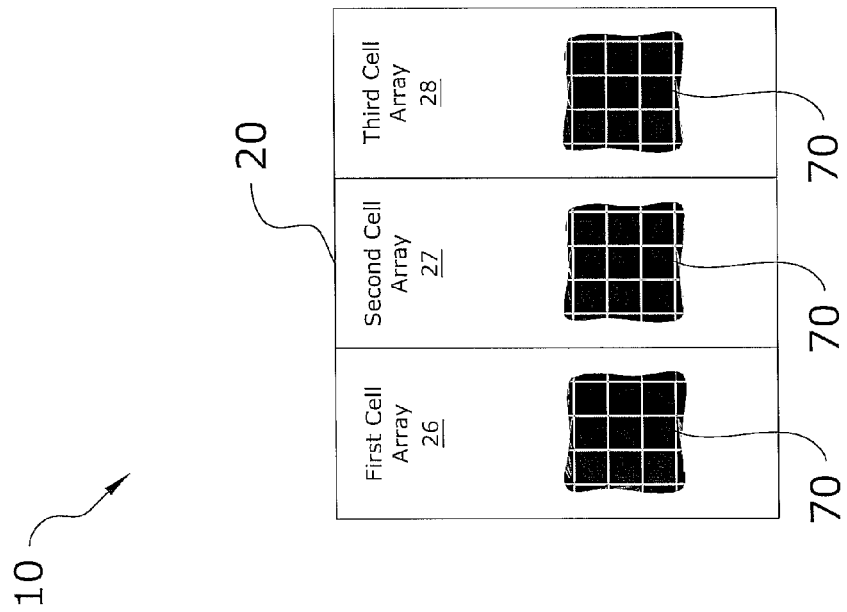

FIGS. 3a through 3f illustrate an example of the present invention being utilized from a start (all of the battery 20 cells unused 72) as illustrated in FIG. 3a to an end (all of the battery 20 cells used 70) as illustrated in FIG. 3f. The example embodiment includes a first cell array 26, a second cell array 27 and a third cell array 28, wherein the cell arrays 26, 27, 28 may include various chemistries to correspond with what circumstance the particular cell array 26, 27, 28 is to be utilized within, such as during extreme high temperature ranges, during extreme low temperature ranges, during normal temperature ranges, for low drain currents, for high drain currents or various others.

In the illustrated embodiment, the first cell array 26 includes cells having a first chemistry for providing current during normal temperature ranges (e.g. approximately −20° Celsius to 50° Celsius), the second cell array 27 includes cells having a second chemistry for providing current for low current loads, and the third cell array 28 includes cells having a third chemistry for providing current for high current loads. The cell arrays 26, 27, 28 may also each include any number of cells included within each respective cell array 26, 27, 28. In the illustrated FIGS. 3a through 3f, a portion of the block indicating the particular cell array 26, 27, 28 is cutaway illustrating a plurality of cells to represent the particular cell array 26, 27, 28. It is also appreciated that, although not illustrated in FIGS. 3a through 3f, the controller 60 switches each of the respective cells within the cell arrays 26, 27, 28 on or off corresponding to a particular condition in which the battery 20 is desired to be utilized in (e.g. high temperatures, high current loads, etc.).

During the illustrated process of utilizing the battery 20, the battery 20 starts out with all of the cells of the cell arrays 26, 27, 28 being illustrated as reserve cells 72. In FIG. 3b, a portion of the cells in the first cell array 26 are illustrated as used cells 70 and another portion of the cells in the first cell array 26 are illustrated as active cells 71. Thus, in FIG. 3b, the battery 20 is operating via the cells in the first cell array 26 and under normal temperature range conditions and normal current load conditions.

In FIG. 3c, a portion of the cells in the first cell array 26 are illustrated as used cells 70, another portion of the cells in the first cell array 26 are illustrated as active cells 71 and another portion of the cells in the second cell array 27 are being illustrated as active cells 71. Thus, in FIG. 3c, the battery 20 is operating via the cells in the first cell array 26 for normal temperature range conditions the via the cells in the second cell array 27 to provide a low drain current to the connected electrical device.

In FIG. 3d, a larger portion of the cells in the first cell array 26 are illustrated as used cells 70, another portion of the cells in the first cell array 26 are illustrated as active cells 71, another portion of the cells in the second cell array 27 are being illustrated as used cells 70 and another portion of the cells in the third cell array 28 are being illustrated as active cells 71. Thus, in FIG. 3d, the battery 20 is operating via the cells in the first cell array 26 for normal temperature range conditions via the cells in the third cell array 28 to provide a high drain current to the connected electrical device.

Figure 3E:
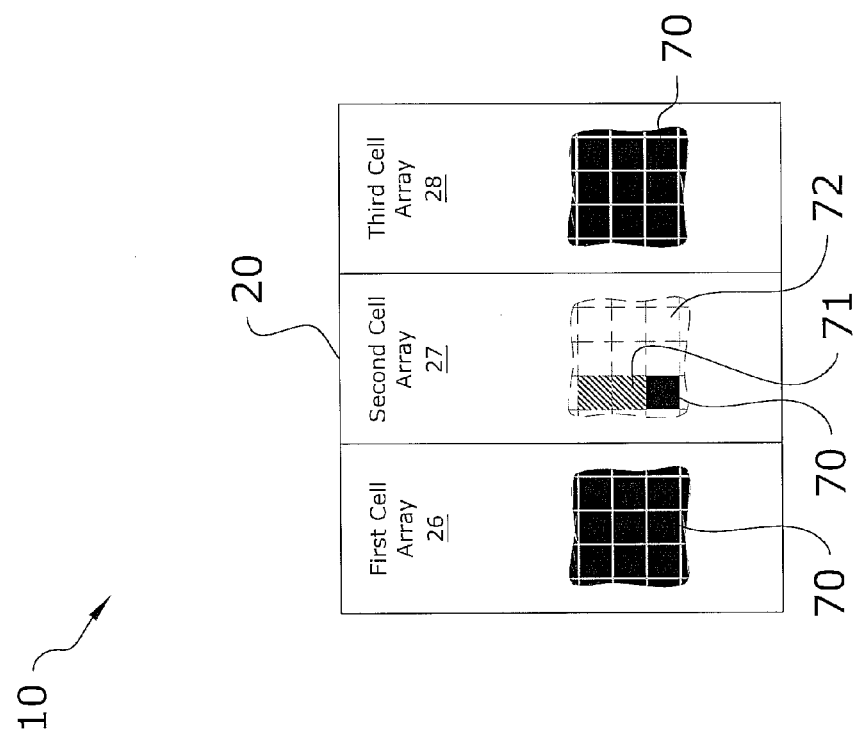

In FIG. 3e, all of the cells in the first cell array 26 are illustrated as used cells 70, another portion of the cells in the second cell array 27 are illustrated as active cells 71, and all of the cells in the third cell array 26 are illustrated as used cells 70. Thus, in FIG. 3e, the battery 20 is operating via the cells in the second cell array 28 to provide a low drain current to the connected electrical device. In FIG. 3f, all of the cells in the first cell array 26, the second cell array 27 and the third cell array are illustrated as used cells 70 and thus the battery 20 is completely depleted.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. An electrochemical energy storage system having at least one cell array, comprising:
    a first electrochemical cell having a first chemistry;
    a second electrochemical cell having a second chemistry;
    wherein said first chemistry is different than said second chemistry, wherein said first chemistry is adapted to provide current over a first temperature range and wherein said second chemistry is adapted to provide current over a second temperature range, wherein said first temperature range is different from said second temperature range;
    a controller in communication with said first electrochemical cell and said second electrochemical cell, wherein said controller is adapted to employ a chemical reaction of said first chemistry in said first electrochemical cell or said second chemistry in said second electrochemical cell; and
    a temperature sensor in communication with said controller.

2. The electrochemical energy storage system having at least one cell array of claim 1, wherein said first electrochemical cell is comprised of a first cell array and wherein said second electrochemical cell is comprised of a second cell array.

3. The electrochemical energy storage system having at least one cell array of claim 1, wherein said controller individually addresses said first electrochemical cell and said second electrochemical cell.

4. The electrochemical energy storage system having at least one cell array of claim 2, wherein said controller includes control logic for determining an addressing sequence of said first electrochemical cell and said second electrochemical cell based on temperature conditions.

5. The electrochemical energy storage system having at least one cell array of claim 1, wherein said first temperature range is comprised of a normal operating temperature and wherein said second temperature range is comprised of a high temperature range.

6. The electrochemical energy storage system having at least one cell array of claim 1, wherein said first temperature range is comprised of a normal temperature range and wherein said second temperature range is comprised of a low temperature range.

7. The electrochemical energy storage system having at least one cell array of claim 1, wherein said controller includes control logic for determining an addressing sequence of said first electrochemical cell and said second electrochemical cell based on capacity load consumption.

8. The electrochemical energy storage system having at least one cell array of claim 1, wherein said controller includes a current sensor.

9. The electrochemical energy storage system having at least one cell array of claim 1, wherein said first chemistry is adapted to provide current for a first load and wherein said second chemistry is adapted to provide current for a second load.

10. The electrochemical energy storage system having at least one cell array of claim 9, wherein said first load is at least partially different than said second load.

11. The electrochemical energy storage system having at least one cell array of claim 1, wherein said first chemistry comprises non-rechargeable chemistry and wherein said second chemistry comprises rechargeable chemistry.

12. An electrochemical energy storage system having at least one cell array, comprising:
    a battery;
    at least one cell array within said battery; and
    a controller in communication with said at least one cell array, wherein said controller is adapted to determine an addressing sequence of said at least one cell array, wherein said controller includes control logic for determining said addressing sequence of said cell array based on temperature conditions.

13. The electrochemical energy storage system having at least one cell array of claim 12, wherein said controller includes a sensor for determining a state of individual cells within said at least one cell array.

14. The electrochemical energy storage system having at least one cell array of claim 12, wherein said controller individually addresses each cell of said cell array.

15. The electrochemical energy storage system having at least one cell array of claim 12, wherein said controller includes control logic for determining said addressing sequence of said cell array based on capacity load consumption.

16. The electrochemical energy storage system having at least one cell array of claim 12, wherein said at least one cell array includes a first cell array including a first chemistry and a second cell array including a second chemistry, wherein said first chemistry is different than said second chemistry.

17. An electrochemical energy storage system, comprising:
- a first cell array having a first chemistry;
- a second cell array having a second chemistry;
- wherein said first chemistry is different than said second chemistry; and
- a controller in communication with said first cell array and said second cell array, wherein said controller is adapted to employ a chemical reaction of said first chemistry in said first cell array or said second chemistry in said second cell array;
- wherein said controller individually addresses said first cell array and said second cell array;
- wherein said controller includes control logic for determining a first addressing sequence of said first cell array and said second cell array based on temperature conditions;
- wherein said controller includes control logic for determining a second addressing sequence of said first cell array and said second cell array based on capacity load consumption.

* * * * *